April 24, 1962 J. L. ANDERSON 3,031,586
MULTI-PURPOSE SUPERCONDUCTOR COMPUTER CIRCUITS
Filed May 19, 1958 2 Sheets-Sheet 1

INVENTOR
JOHN L. ANDERSON
BY John E Dougherty Jr
ATTORNEY 3,031,586

MULTI-PURPOSE SUPERCONDUCTOR COMPUTER CIRCUITS

John L. Anderson, Poughkeepsie, N.Y., assignor to International Business Machines Corporation, New York, N.Y., a corporation of New York Filed May 19, 1958, Ser. No. 736,313
16 Claims. (Cl. 307—88.5)

Figure 1:
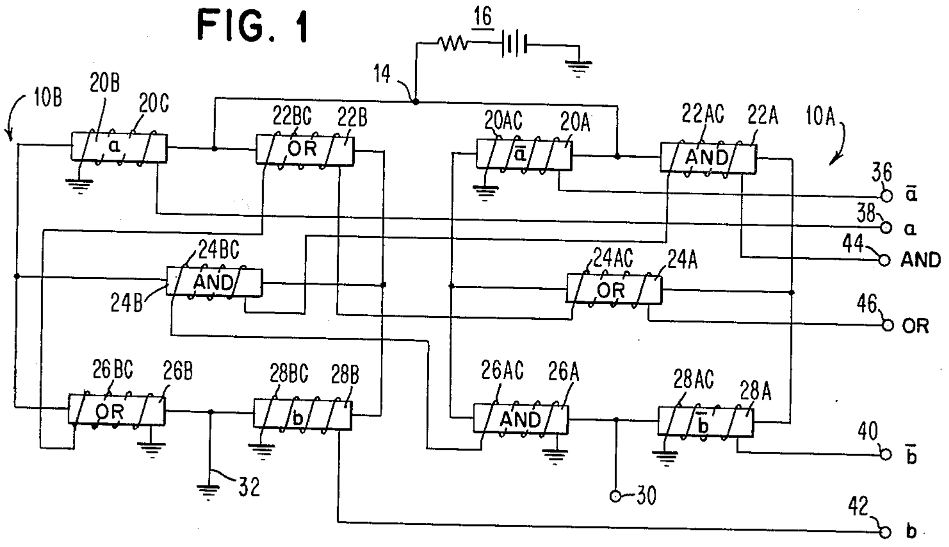

The present invention relates to superconductor circuits and, more particularly, to computer circuits employing superconductor gating devices which are capable of being biased to render the circuits operable to perform any one of a number of different computer functions.

The article by D. A. Buck entitled "A Cryotron—A Superconductive Computer Element," which appeared in the April 1956 issue of the Proceedings of the IRE at pages 482–493, includes a summary both of the theory of superconductivity and the history of its development, and cites a number of informative publications on the subject. This article is directed, in the main, to a discussion of superconductive circuits such as might be used in computer applications and proposes as a basic switching or gating element for such circuits a device which is termed a cryotron which comprises a gate conductor of a superconductive material around which is wound a control coil. The control coil is preferably fabricated of a superconductive material requiring a more intense magnetic field to drive it into a normal or resistive state at the operating temperature of the circuit than is required to so drive the superconductive material of the gate conductor. Cooling apparatus is provided for maintaining both the gate and coil below the temperatures at which the superconductive materials of which they are fabricated undergo transitions between normal and superconductive states in the absence of a magnetic field. The gating function is achieved by energizing the control coil with sufficient current to render it effective to apply to the gate conductor a magnetic field of sufficient intensity to cause the gate conductor to assume a normal or resistive state. Devices of this type need not be wire wound but may be also fabricated using thin films, as is illustrated in copending application Serial No. 625,512, filed November 30, 1956, in behalf of R. L. Garwin and assigned to the assignee of the subject application.

The inventor, in whose behalf the subject application for patent is filed, has discovered a novel way of interconnecting cryotron type devices to fabricate multi-purpose computer circuits or, more specifically, circuits which are capable of being biased in a variety of different ways to be operable to perform any one of a number of different computer functions. These circuits are particularly adapted to computer applications wherein a number of such circuits may be selectively biased in one application to perform one overall computer function and, in another application, to perform an entirely different computer function. The embodiments of the invention which are disclosed herein in order to illustrate the principles of applicant's invention, as well as other circuits which will be evident to those skilled in the art in light of these illustrative embodiments, may be fabricated with cryotron devices either of the wire wound or the thin film type, though wire wound cryotrons are shown to be utilized in the embodiments disclosed.

Thus, an object of the present invention is to provide multi-purpose computer circuits using cryotron type gating devices.

A further object is to provide multi-purpose logical circuits employing cryotron type devices.

Still another object is to provide cryotron circuitry which may be selectively biased in at least first and second operating conditions and which is operable to produce outputs in accordance with one logical function when in the first operating condition and in accordance with a different logical function when in the second operating condition.

Still another object is to provide circuits of the above described type which include two parallel networks, one of which is effective when the circuit is in any one of its operating conditions to provide a superconductive current path only when the inputs applied to the circuit satisfy the requirements of the particular logical function to be performed by the circuit when in that condition, and the other of which provides a superconductive circuit path only when the inputs applied satisfy the function which is the inverse of that particular logical function.

A further object is to provide cryogenic computer circuits capable of assuming a plurality of different stable states and operable in each of the stable states to perform a different computer function.

Still another object is to provide circuitry of the above described type wherein superconductive loops, in which persistent currents may be selectively established, are employed to bias the circuit to operate in accordance with any one of a number of different logical functions.

Other objects of the invention will be pointed out in the following description and claims and illustrated in the accompanying drawings, which disclose, by way of example, the principle of the invention and the best mode, which has been contemplated, of applying the principle.

In the drawings:

FIG. 1 is a diagrammatic representation of a circuit capable of being biased to operate either as an AND or an INCLUSIVE OR circuit.

Figure 2:
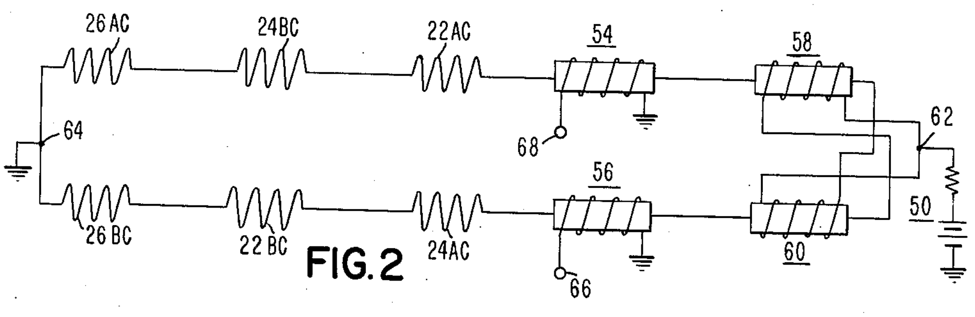
Figure 3:
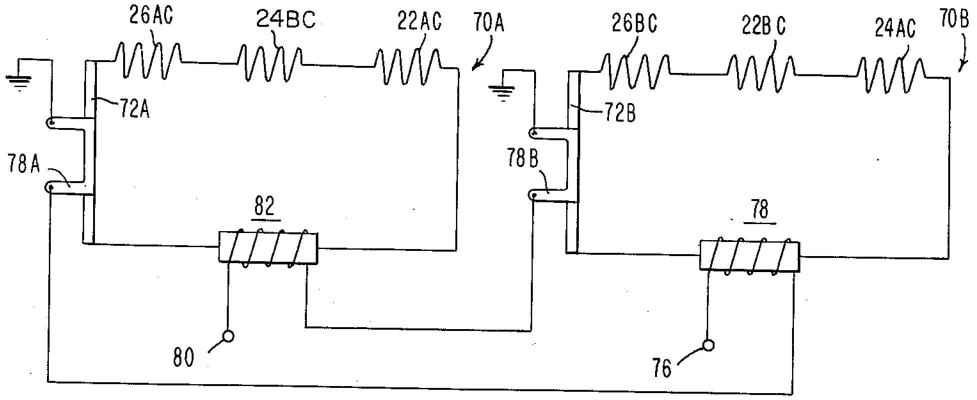
Figure 4:
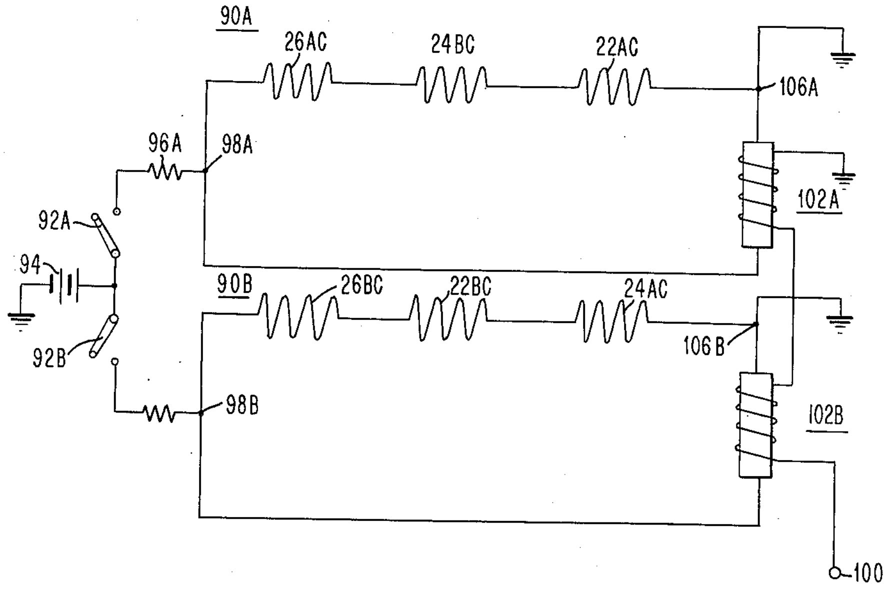

FIGS. 2, 3, and 4 are diagrammatic representations of circuits which may be utilized to bias the multi-purpose circuits of the subject invention to perform different computer functions.

Figure 5:
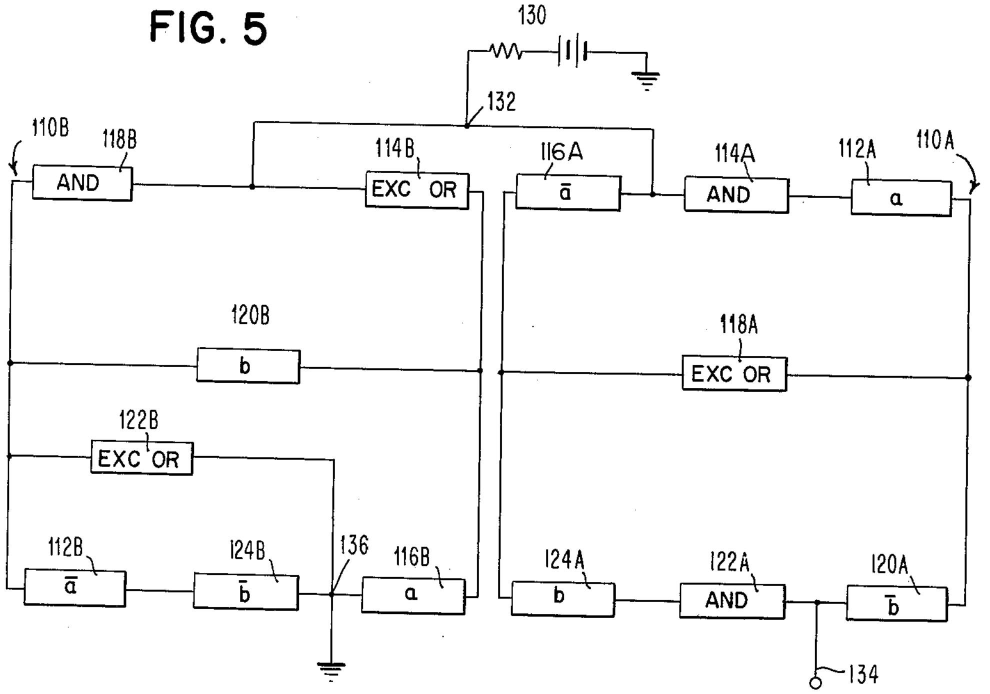

FIG. 5 is a diagrammatic representation of a cryogenic circuit which may be biased to perform either the AND or the EXCLUSIVE OR logical functions.

Referring now to FIG. 1, there is shown a circuit constructed in accordance with the principles of the invention which is capable of performing both the AND and INCLUSIVE OR logical functions. This circuit may be considered to comprise two circuit networks which are designated 10A and 10B. These networks extend in parallel from a terminal 14 which is connected to a current source 16 represented by a battery and a resistor. The network 10A includes five cryotron gate conductors, which are designated 20A, 22A, 24A, 26A, and 28A, and which are connected in a number of different parallel current paths between terminal 14 and an output terminal for the circuit which is designated 30. The other network 10B, similarly, includes five cryotron gate conductors 20B, 22B, 24B, 26B, and 28B, and also provides a number of parallel current paths which extend between terminal 14 and a terminal 32 which is connected to ground. Each of the ten cryotron gate conductors in the circuit is provided with a control coil, the coils being designated with the same designations as the gates with the letter "C" added. The logical inputs to the circuit are supplied at a number of terminals 36, 38, 40, and 42, the first two of these terminals being the "*a*" input terminals to which input current pulses are supplied representative of binary inputs of one and zero. The other two terminals are the "*b*" input terminals and, similarly, receive pulses representative of binary one and zero. An "*a*" input representative of a binary one is applied by applying a pulse to terminal 38 which may therefore be designated the "*a*" terminal, and an "*a*" input representative of a binary zero is applied by applying a pulse to terminal 36 which is termed the $\bar{a}$ terminal. Similarly, terminals 40 and 42 are designated $\bar{b}$ and *b*, since a pulse is applied to the former for a "*b*" input representative of a binary zero and to the latter for a "*b*" input representative of a binary one.

Therefore, when inputs are applied to the circuit, a pulse is applied to one or the other of the terminals 36 and 38 and one or the other of the terminals 40 and 42. These terminals 36, 38, 40, and 42 are connected to the control coils 20AC, 20BC, 28AC, and 28BC, respectively, and each of these coils is effective, when a current pulse is applied to the terminal to which it is connected, to produce a magnetic field of sufficient intensity to cause the gate conductor with which it is associated to be driven from a superconductive to a normal or resistive state. Each of the cryotron gates is represented by a block, and within each block there is shown a designation indicative of the input condition for which that cryotron gate is in a normal or a resistive state. Thus, gate 20A is resistive when an "*a*" input of zero is applied; gate 20B is resistive for an "*a*" input of one; gate 28A is resistive for a "*b*" input of zero; and gate 28B is resistive for a "*b*" input of one.

The logical outputs which are produced by the circuit of FIG. 1 for various combinations of "*a*" and "*b*" inputs are controlled by applying bias currents at one or the other of a pair of terminals 44 or 46. Terminal 44 is designated the AND bias terminal and receives a bias current when the circuit is to be operated as an AND circuit. This terminal is connected to a control or bias line which includes coils 22AC, 24BC, and 26AC, and, thus, gates 22A, 24B, and 26A are, as indicated by the designations within the block representation for these gates, resistive when a bias current is applied at terminal 44 and the circuit is functioning as an AND circuit. The other bias or control terminal 46 receives a bias current when the circuit is to function as an INCLUSIVE OR circuit. In this case, current is applied to control coils 24AC, 22BC, and 26BC so that gates 24A, 22B, and 26B are maintained in a resistive state.

Consider now, for example, the operation of the circuit as an AND logical circuit, that is, with a bias current applied at terminal 44 to maintain gates 22A, 24B, and 26A in a resistive state. An output is properly produced at terminal 30 in accordance with the AND logical function only when "*a*" and "*b*" inputs representative of a binary one are applied, that is, when input current signals are applied both at terminal 38 and at terminal 42. Gate conductors 20B and 28B are driven resistive by these input pulses. At the time gate 24B in network 10B is held resistive by the bias current applied at terminal 44, so that it is impossible to complete a current path from terminal 14 through network 10B to ground terminal 32 without passing through at least one resistive gate conductor. However, under these conditions, a completely superconductive path is available from terminal 14 through network 10A. This path extends through gates 20A, 24A, and 28A, all of which are in a superconductive state, to the terminal 30. The entire current from source 16 passes through this completely superconductive path to output terminal 30, and the presence of this current at this terminal is indicative, when the circuit is being operated as an AND circuit, that the value of both the "*a*" and "*b*" inputs, then applied, is one.

It is, of course, necessary that the utilization circuitry which completes the circuit path from terminal 30 to a ground such as that to which terminal 32 is connected is also completely superconductive. Such utilization circuitry may include control coils for other cryotrons which are employed in flip flops, registers, and further logical circuits. It should also be noted that, when the inputs and bias currents are applied directly to the terminals 36 through 44 and there is no cross coupling between the circuits connected to these terminals, neither the input and bias circuits themselves nor the control coils in these circuits need be in a superconductive state.

For all other possible combinations of "*a*" and "*b*" inputs, that is, where one or both of the inputs is a binary zero, one or the other of the gates 20A and 28A is in a resistive state so that network 10A is resistive. However, for such combinations of inputs, one or the other or both of the gates 20B and 28B are in a superconductive state so that a completely superconductive path is available through network 10B to ground terminal 32. All of the current from source 16 is then shunted through the latter network to the ground terminal 32 and no output current is present at terminal 30.

When the circuit is operated to produce outputs in accordance with the INCLUSIVE OR logical function, a bias current is applied at terminal 46, thereby causing gates 22B, 24A and 26B to be driven resistive and allowing gates 22A, 24B, and 26A to remain superconductive. When, with this bias current applied, either or both of the "*a*" and "*b*" inputs are binary ones, that is, when an input pulse is applied at terminal 38 and/or terminal 42 and, correspondingly, to only one or neither of the terminals 36 and 40, the network 10B is resistive and a completely superconductive path is available in network 10A from terminal 14 to output terminal 30. For example, consider the case wherein an "*a*" input of one and a "*b*" input of zero are applied, that is, when pulses are applied at terminals 38 and 40. A superconductive path then exists in network 10A from terminal 14 through gate 20A and gate 26A to terminal 30, while in network 10B with gates 22B and 26B resistive, the only possible path must include gates 20B, 24B, and 28C, and the first named of these gates is in a resistive state for this combination of inputs. Similarly, for all other possible combinations of inputs when a pulse is applied to either one or both of the terminals 38 and 42 representative of a binary one, network 10B is resistive and a superconductive path exists in network 10A through gates 20A and 26A and/or gates 22A and 28A to output terminal 30 so that an output current is produced at this terminal in accordance with the INCLUSIVE OR logical function. Though in the above described circuit, the output of the network 10B is shown to be connected to ground, this output may also be directed through utilization circuitry which is to be responsive to logical functions which are the inverse of the logical AND and logical INCLUSIVE OR functions performed by the network 10A. Actually the circuit of FIG. 1 may be considered to comprise two circuit networks, each of which may be biased so that it provides a completely superconductive path in accordance with one or the other of two different logical combinations of inputs with the logical functions of one network being the inverse of the logical functions of the other so that, for any combination of inputs, only one of the networks provides a completely superconductive path from terminal 14 to the appropriate one of the terminals 30 or 32 and the other network is in a resistive state. Therefore, for any combination of inputs, all of the current from source 16 is directed through one or the other of the networks 10B or 10A to the appropriate one of the terminals 32 or 30 and, under no conditions does the current divide between these networks when inputs are applied.

FIGS. 2, 3, and 4 show various circuit arrangements for applying the bias currents to the control coils of FIG. 1 to thereby control the logical functions performed by that circuit. In each of these circuit diagrams, only the control coils of the various cryotrons of FIG. 1 are shown with these coils being identified with the same designations as are used in that figure. In FIG. 2, the two sets of control coils are connected in opposite sides of a cross coupled cryotron flip flop circuit of the type shown and described in the article by D. A. Buck which appeared in the April 1956 issue of the Proceedings of the IRE, pages 482–493. The current for this circuit is supplied by current source 50, represented by a battery and resistor, and the circuit includes two input cryotrons 54 and 56 and two cross coupled cryotrons 58 and 60. The circuit is divided into two parallel paths extending between a terminal 62, which is connected to current source 50, and a ground terminal 64, and is capable of assuming two different stable states. When this circuit is in a first one of its stable states, the current from the source 50 is in the first one of these parallel paths which includes one set of the cryotron control coils 22AC, 24BC, and 26AC; and, when in its second stable state, the supply current flows in the second parallel path which includes the other set of control coils 24AC, 22BC, and 26BC. The first of these parallel circuits includes the gate conductor of input cryotron 54, the gate conductor of coupling cryotron 58 and the control conductor of the other coupling cryotron 60; the second path includes the gate conductor of input cryotron 56, the gate conductor of coupling cryotron 60, and the control coil of the other coupling cryotron 58. Thus, it can be seen that when the current is in either one of the parallel paths and, therefore, the circuit is in one of its stable states, that current flows through the control coil for the coupling cryotron, the gate of which is connected in the other path, to hold that cryotron resistive and maintain the circuit stably in the state that it is in. The circuit can be switched back and forth between its stable states by applying input current pulses at terminals 66 and 68, a current pulse applied to the former terminal being effective to cause the circuit to assume its first stable state with current in control coils 22AC, 22BC, and 26AC, and a current pulse applied to the latter terminal being effective to cause the circuit to assume its second stable state with the source current in control coils 24AC, 22BC, and 26BC. By examination of the circuit of FIG. 1, it can be seen that this circuit operates as an AND circuit when coils 22AC, 24BC, and 26AC are energized and as an INCLUSIVE OR circuit when the other set of control coils 24AC, 22BC, and 26BC is energized. Therefore, the circuit of FIG. 1, when employing the control circuitry of FIG. 2, may be made operative as an AND circuit by applying a pulse at terminal 66 to energize the control coil of input cryotron 56 to thereby switch the flip flop of FIG. 2 to its first stable state. Once this is accomplished, the circuit of FIG. 1 will continue to operate as an AND circuit without the application of further input pulses to either of the terminals 66 and 68. When it is desired to set up the logical circuit of FIG. 1 as an INCLUSIVE OR circuit, it is only necessary to apply a current pulse at terminal 68 to energize input cryotron 54 in which case the flip flop circuit of FIG. 2 assumes its second stable state and the logical circuit depicted in FIG. 1 operates as an INCLUSIVE OR circuit until another control pulse is applied at terminal 66.

FIG. 3 shows a persistent current circuit which may be used to control the logical functions performed by the circuit of FIG. 1. This circuit includes two superconductive loops which are designated 70A and 70B. Each of these loops includes a control section or bar designated, respectively, 72A and 72B. The manner in which this type of circuit is operated so that persistent currents are alternately stored in one or the other of these loops is described in detail in copending application Serial No. 704,627, filed December 23, 1957, in behalf of J. L. Anderson and assigned to the assignee of the subject application. Briefly, when it is desired to energize the first set of control coils which are connected in the persistent current loop 70A and, therefore, make the circuit of FIG. 1 operable as an AND circuit, an input current pulse is applied at a terminal 76. This current is directed through the control coil of a cryotron 78, the gate conductor of which is connected in loop 70B, to drive that gate resistive and thereby quench any persistent current which may be stored in this loop. The current pulse is also directed to a control bar 78A which is arranged over the control section 72A in loop 70A and is effective to drive at least a portion of this section from a superconductive to a normal state. The control bar 78A is arranged to be magnetically coupled to loop 70A so that, when the current pulse applied at terminal 76 is terminated, thereby allowing section 72A to again become superconductive, a persistent current is stored in loop 70A. This persistent current passes through control coils 22AC, 24BC, and 26AC to bias the appropriate cryotrons in FIG. 1 resistive and render that circuit operable as an AND circuit. Similarly, when an input pulse is applied at terminal 80, the control conductor of a cryatron 82 is energized, thereby driving its gate conductor resistive. Since this gate conductor is, as shown, connected in loop 70A, the persistent current stored in that loop is then quenched and, as before, the control bar 78B drives at least a portion of section 72B in loop 70B resistive so that, upon termination of the input pulse applied at terminal 80, when section 72B is again allowed to become superconductive, a persistent current is established in loop 70B to energize control coils 24AC, 22BC, and 26BC to render the circuit of FIG. 1 operable to function as an INCLUSIVE OR circuit.

A different circuit arrangement employing persistent currents to control the logical functions performed by the circuit of FIG. 1 is shown in FIG. 4. This circuit also includes two superconductive loops designated 90A and 90B and persistent current is stored in the first loop 90A when it is desired to control the logical circuit to operate as an AND circuit and in the second loop 90B when it is desired to control the logical circuit of FIG. 1 to operate as an INCLUSIVE OR circuit. The mode of operation and structure employed in the circuit of FIG. 4 to store persistent currents is similar to that described in some detail in copending application Serial No. 615,-814, which was filed on October 15, 1956, in behalf of R. L. Garwin and assigned to the assignee of this application. When it is desired to store a persistent current in loop 90A and, therefore, render the logical circuit of FIG. 1 operable as an AND circuit, a switch 92A is closed to direct the current from a battery 94 through a resistor 96A to a terminal 98A in loop 90A. At the same time, a pulse is applied at a terminal 100 to energize the control coils for a pair of cryotrons 102A and 102B. The gates of these cryotrons are connected in loops 90A and 90B, respectively. When switch 92A is closed, the current from source 94 is directed to terminal 98A in loop 90A and, since the gate of cryotron 102A is resistive, the entire current passes through control coils 26AC, 24BC, and 22AC to a ground terminal 106A. When this current condition has been established, the pulse applied at terminal 100 is terminated, thereby allowing the gates of cryotrons 102A and 102B to again become superconductive. This occurrence does not disturb the current distribution in loop 90A, since the circuit extending from terminal 98A to 106A which includes the control coils 26AC, 24BC, and 22AC is also entirely superconductive. However, when switch 92A is opened with loop 90A entirely superconductive, a current is stored in this loop since it is not possible to change the net flux threading the superconductive loop unless at least a portion of the loop is driven resistive. Thus, when, as described above, switch 92A is closed to connect terminal 98A to source 94 and an input pulse is applied at terminal 100 to drive the gates of cryotrons 102A and 102B resistive and, thereafter, the gates of these cryotrons are allowed to become superconductive after which switch 92A is again opened, a current is stored in loop 90A, thereby energizing the control coils in that loop and rendering the circuit of FIG. 1 operable as an AND circuit.

In the above described operation, switch 92B remained open so that no current was applied to loop 90B. When it is desired to store current in this loop and thereby render the circuit of FIG. 1 operable as an INCLUSIVE OR circuit, the operation is the same with the exception that switch 92B is closed and switch 92A remains open. With the gate of cryotron 102B maintained resistive by the pulse applied at terminal 100, the current from source 94 is directed through the three control coils in loop 90B. When, after the pulse at terminal 100 is terminated to allow the gate of 102B to again become superconductive, switch 92B is opened, a persistent current is stored in loop 90B to energize the proper coils to render the logical circuit of FIG. 1 operable as an INCLUSIVE OR circuit. It should be noted that during this latter described operation the control coil of cryotron 102A is also energized to drive the gate of this cryotron resistive and thereby quench the persistent current stored in loop 90A. Similarly, if, at a later time, a persistent current is stored in loop 90A, the gate of cryotron 102B is necessarily driven resistive during the operation, thereby quenching any persistent current in that loop so that a persistent current is stored in only one or the other of the two loops 90A or 90B at any one time.

In FIG. 5, there is shown another logical circuit constructed in accordance with the principles of the invention. In this circuit, only the gates of the various cryotrons employed are shown, it being readily understood that with each gate there is associated a control coil and these control coils may be connected in circuits similar to those shown in FIGS. 1, 2, 3, and 4 to bias the cryotrons to perform the desired logical functions. The circuit of FIG. 5 includes two circuit networks which are designated 110A and 110B and may be operated to perform either the AND or the EXCLUSIVE OR logical function. Each of these networks includes seven cryotron gates, the control coils of three of which are connected in the circuits to which the bias currents are applied and the control coils for the other four of which are connected to the terminals at which the pulses representative of binary one and zero "*a*" and "*b*" inputs are applied. Within the block representation employed for each gate conductor, the input condition for which this conductor is in a resistive state is shown. Thus, it can be seen for an "*a*" input representative of a binary one, gate conductors 112A and 116B are in a resistive state and that, when an "*a*" input of zero is applied, the cryotrons designated 116A and 112B are in a resistive state. Similarly, for a "*b*" input, of zero, cryotrons 120A and 124B are resistive and for a "*b*" input of one, cryotrons 124A and 120B are resistive. The three -cryotrons designated 114A, 122A, and 118B are maintained resistive when the circuit is operated as an AND circuit and the three cryotron gates 118A, 114B and 122B are maintained resistive when the circuit is operated as an EXCLUSIVE OR circuit. Current for the circuit is supplied by a source 130, represented by a battery and a resistor, to a terminal 132 and the outputs realized at a terminal 134 which is connected to terminal 132 by network 110A. The current supplied by source 130 is directed through network 110B to a ground terminal 136 whenever the particular "*a*" and "*b*" inputs applied do not satisfy the requirements of the logical function for which the circuit is then biased. Thus, for example, it can be seen that, when the circuit is operated as an AND circuit with cryotron gates 114A, 112A, and 118B resistive, there is a superconductive path from terminal 132 through network 110A to terminal 134 only when "*a*" and "*b*" inputs of one are applied. This path extends through cryotron gate conductor 116A, 118A, and 120A. At this time, network 110B is resistive so that all of the current from source 130 is directed to terminal 134. However, for all other possible combinations of "*a*" and "*b*" inputs, network 110A is resistive and a completely superconductive circuit is available from terminal 132 through network 110B to ground terminal 136. This circuit extends through cryotron gate 114B and either directly through cryotron gate 116B to terminal 136 or through cryotron gates 120B and 122B to terminal 136. The circuit, therefore, satisfies the requirements of a logical AND circuit in that a current is present at terminal 134 only when both of the "*a*" and "*b*" inputs applied are representative of a binary one and, in all other cases, the current from source 130 is shunted to terminal 136.

When the circuit of FIG. 5 is to be operated as an EXCLUSIVE OR circuit, cryotron gates 114A, 122A, and 118B are allowed to remain superconductive and the coils for gates 118A, 114B, and 122B are energized to drive these gates resistive. With the circuit in this condition, the current from source 130 is directed through network 110A to terminal 134 only when the value of one or the other, but not both, of the "*a*" and "*b*" inputs is a binary one. The circuit may extend either through cryotron gates 114A, 112A and 120A to terminal 134 or through cryotron gates 116A, 124A, and 122A to this output terminal. When such inputs are applied, that is, an "*a*" input of one and a "*b*" input of zero, or an "*a*" input of zero and a "*b*" input of one, network 110B is resistive. However, when both the "*a*" and "*b*" inputs are either zero or one, a superconductive path is available in network 110B and network 110A is resistive. For "*a*" and "*b*" inputs of one, a superconductive circuit exists in network 110B through cryotron gates 118B, 112B, and 124B to terminal 136; and, when both the inputs are zero, a superconductive circuit exists through gates 118B, 120B, and 116B to the ground terminal.

As in the case of the circuit of FIG. 1, the presence of a current at terminal 136 may be employed to indicate the inverse of the logical AND and EXCLUSIVE OR functions. Further, it should be readily apparent that these circuits are illustrative only in that the principles demonstrated therein may be applied in constructing cryogenic circuits capable of performing any desired logical functions in accordance with the manner in which they are biased. Such circuits, of course, have great utility in computer applications where the programming of the machine, to perform any desired computer functions, may be accomplished merely by properly biasing a large number of such circuits, each capable of performing a variety of different logical functions in accordance with the manner in which they are biased. Thus, for example, in a computer which includes circuits of the types shown in FIGS. 1 and 5, each such circuit might be utilized independently to perform one logical function or the same "*a*" and "*b*" inputs might be applied to a circuit of the type shown in FIG. 5 and to either another circuit of the same type or a circuit of the type shown in FIG. 1 and these circuits biased so that the first is operable as an EXCLUSIVE OR circuit and the other as an AND circuit. In such an operation, the two circuits will perform the function of a logical half adder, the sum output for which would be produced at the output terminal for the circuit performing the EXCLUSIVE OR logical function and the carry output for which would be produced at the output terminal of the circuit performing the AND logical function.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A circuit capable of operating either as an AND or as an INCLUSIVE OR circuit comprising a first superconductive network connecting a current source to a first terminal; a second superconductive network connected in parallel with said first network with respect to said current source and connecting said source to a second terminal; each of said networks including only five gate conductors; each of said gate conductors being provided with a control conductor arranged in magnetic field applying relationship thereto for controlling the state, superconductive or normal, thereof; means for energizing four of said control conductors with signals representative of binary one and binary zero values of first and second binary inputs for said circuit; and means for selectively energizing either a first group consisting of three of the remaining ones of said control conductors to render said circuit operable as an AND circuit or a second group consisting of the other three of said remaining ones of said control conductors to render said circuit operable as an INCLUSIVE OR circuit.

2. The circuit of claim 1 wherein, when said first group of control conductors is energized, said first network provides a superconductive path to said first terminal when binary inputs are applied only when the combination of applied inputs satisfies the AND logical function, and for all other combinations of applied inputs said second network provides a superconductive path to said second terminal.

3. The circuit of claim 2 wherein, when said second group of control conductors is energized, said first network provides a superconductive path to said first terminal when binary inputs are applied only when the combination of applied inputs satisfies the INCLUSIVE OR logical function and for all other combinations of applied inputs said second network provides a superconductive path to said second terminal.

4. A circuit capable of operating either as an AND or as an EXCLUSIVE OR circuit comprising a first superconductive network connecting a current source to a first terminal; a second superconductive network connected in parallel with said first network with respect to said current source and connecting said source to a second terminal, each of said networks including only seven gate conductors; each of said gate conductors being provided with a control conductor arranged in magnetic field applying relationship thereto for controlling the state, superconductive or normal, thereof; means for energizing eight of said control conductors with signals representative of binary one and binary zero values of first and second binary inputs for said circuit; and means for selectively energizing either a first group consisting of three of the remaining ones of said control conductors to render said circuit operable as an AND circuit or a second group consisting of the other three of said remaining ones of said control conductors to render said circuit operable as an EXCLUSIVE OR circuit.

5. The circuit of claim 4 wherein, when said first group of control conductors is energized, said first network provides a superconductive path to said first terminal when binary inputs are applied only when the combination of applied inputs satisfies the AND logical function, and for all other combinations of applied inputs said second network provides a superconductive path to said second terminal.

6. The circuit of claim 5 wherein, when said second group of control conductors is energized, said first network provides a superconductive path to said first terminal when binary inputs are applied only when the combination of applied inputs satisfies the EXCLUSIVE OR logical function, and for all other combinations of applied inputs said second network provides a superconductive path to said second terminal.

7. A superconductive computer circuit comprising a plurality of gate conductors connected in a superconductive network between a current source and a terminal; a plurality of control conductors each arranged in magnetic field applying relationship to at least a corresponding one of said gate conductors for controlling the state, superconductive or normal, thereof; means for energizing said control conductors in accordance with input signals for said circuit; first and second superconductive loops each including portions in magnetic field applying relationship to one or more portions of said superconductive network and each effective when a persistent current is established therein to control said circuit to perform a different computer function; and means for selectively establishing persistent currents in said loops.

8. The circuit of claim 7 wherein said circuit is operable to perform a first logical function when persistent current is established in said first superconductive loop and is operable to perform a second logical function when persistent current is established in said second superconductive loop.

9. In a logical circuit capable of being caused to assume first and second different stable states; a superconductive network connecting a current source to an output terminal for said circuit; said network including a plurality of different paths for connecting said source to said terminal; a plurality of gate conductors, there being at least one gate conductor in each of said paths; a plurality of control conductors each arranged in magnetic field applying relationship with a corresponding one of said gate conductors and each effective when energized to cause the corresponding gate conductor to be driven from a superconductive to a resistive state; means coupled to said control conductors for energizing said control conductors in accordance with a plurality of logical inputs for said circuit; said circuit being operable to produce outputs at said output terminal in response to said logical inputs in accordance with a first logical function when in said first stable state and in accordance with a second logical function when in said second stable state; and means for controlling the stable states of said circuit comprising first and second superconductive loops each including portions in magnetic field applying relationship to portions of said superconductive network, and means for selectively establishing persistent currents in one or the other of said first and second superconductive loops.

10. A logical circuit comprising first, second and third groups of gate conductors maintained at a temperature at which each is superconductive in the absence of a magnetic field; said gate conductors being connected in first and second networks, said first and second networks being connected in parallel with a current source; first, second and third groups of control conductors for said first, second and third groups of gate conductors, respectively; each of said control conductors being arranged in magnetic field applying relationship to a corresponding one of said gate conductors and effective when energized to cause that gate conductor to be driven from a superconductive to a resistive state; means for energizing said control conductors in said first group with signals representative of binary one and zero values for first and second binary inputs for said circuit; each of said control conductors being energized only for a particular value, one or zero, for a particular one of said inputs; said second group of gate conductors when in a resistive state being effective to cause said first network to become resistive when said binary input signals are applied when the combination of the inputs applied fail to satisfy a first particular logical function and said second network to become resistive when the combination of the inputs applied fails to satisfy the logical function which is the inverse of said first particular logical function; said third group of gate conductors being effective when in a resistive state to cause said first network to become resistive when said binary input signals are applied when the combination of the inputs applied fails to satisfy a second and different particular logical function and said second network to become resistive when the combination of inputs applied fails to satisfy the logical function which is the inverse of said second particular logical function; said control conductors in said second and third groups being connected in a bistable circuit wherein current flows in said control conductors in said second group when said bistable circuit is in its first stable state and in said control conductors in said third group when said bistable circuit is in its second stable state; and means for selectively causing said bistable circuit to assume one or the other of said first and second bistable states.

11. A logical circuit comprising first, second and third groups of gate conductors maintained at a temperature at which each is superconductive in the absence of a magnetic field; said gate conductors being connected in first and second networks; said first and second networks being connected in parallel with a current source; first, second and third groups of control conductors for said first, second and third groups of gate conductors, respectively; each of said control conductors being arranged in magnetic field applying relationship to a corresponding one of said gate conductors and effective when energized to cause that gate conductor to be driven from a superconductive to a resistive state; means for energizing said control conductors in said first group with signals representative of binary one and zero values for first and second binary inputs for said circuit; each of said control conductors being energized only for a particular value, one or zero, for a particular one of said inputs; said second group of gate conductors when in a resistive state being effective to cause said first network to become resistive when said binary input signals are applied when the combination of the inputs applied fail to satisfy a first particular logical function and said second network to become resistive when the combination of the inputs applied fails to satisfy the logical function which is the inverse of said first particular logical function; said third group of gate conductors being effective when in a resistive state to cause said first network to become resistive when said binary input signals are applied when the combination of the inputs applied fails to satisfy a second and different particular logical function and said second network to become resistive when the combination of inputs applied fails to satisfy the logical function which is the inverse of said second particular logical function; said control conductors in said second group being connected in a first superconductive loop; said control conductors in said third group being connected in a second superconductive loop; and means for selectively energizing said control conductors in said second and third groups comprising means for selectively establishing persistent currents in said first and second superconductive loops.

12. In a logical circuit for controllably producing outputs in accordance with different logical combinations of first and second binary inputs; a first superconductive network connecting a current source to a first terminal; a second superconductive network connected in parallel with said first network with respect to said current source and connecting said source to a second terminal; each of said networks including first, second, third and fourth current paths connecting said source to the corresponding one of said terminals; each of said networks including first, second, third, fourth and fifth gate conductors; said first and fourth gate conductors in each network being series connected in said first path thereof; said first, third and fifth gate conductors in each network being series connected in said second path thereof; said second and fifth gate conductors in each network being series connected in said third path thereof; said second, third and fourth gate conductors in each network being series connected in said fourth path thereof; a plurality of control conductors, one for each of said gate conductors in each network for controlling the state, superconductive or normal thereof; means for energizing certain of said control conductors for gate conductors in each network in accordance with first and second binary inputs for said circuit; and means for selectively energizing the control conductors for either a first group of the remaining ones of said gate conductors or a second group of the remaining ones of said gate conductors to control the circuit to provide outputs representative of either a first or a second logical combination of said binary inputs.

13. The circuit of claim 12 wherein said means for energizing said control conductors in accordance with first and secondary binary inputs for said circuit includes: means for energizing the control conductor of the first gate conductor in the first network to apply a first binary zero input to said circuit, the control conductor for the first gate conductor in said second network to apply a first binary one input to said circuit, the control conductor for the fifth gate conductor of said first network to apply a second binary zero input to said circuit, and the control conductor for the fifth gate conductor of said second network to apply a second binary one input to said circuit.

14. The circuit of claim 12 wherein said first group of gate conductors includes the second and fourth gate conductors in said first network and the third gate conductor in said second network; and the second group of gate conductors includes the third gate conductor in said first network and the second and fourth gate conductors in said second network; whereby when the control conductors of said first group of gate conductors are energized said circuit produces outputs in accordance with the AND logical function and when the control conductors for said second group of gate conductors is energized said circuit produces outputs in accordance with the Inclusive OR logical function.

15. The circuit of claim 12 wherein said each network includes sixth and seventh gate conductors and control conductors for controlling the state thereof; said sixth gate conductor in said first network being series connected in said first and fourth paths and said seventh gate conductor in said first network being series connected in said third and fourth paths; said sixth gate conductor in said second network being series connected in said first and fourth paths and said seventh gate conductor in said second network being series connected with said first gate conductor to form a fifth current path in said second network from said current source to said second terminal, and series connected with said second and third gate conductors to form a sixth current path in said second network from said current source to said second terminal.

16. The circuit of claim 12 wherein the control conductors for the gate conductors in said first group are connected in a first closed superconductive loop and the control conductors for the gate conductors in said second group are connected in a second closed superconductive loop, and means are provided for selectively establishing in one or the other of said loops a persistent current which persists in the loop in the absence of electrical energy applied to the loop.

References Cited in the file of this patent

UNITED STATES PATENTS 2,832,897 Buck ------------------ Apr. 29, 1958

OTHER REFERENCES

"The Summing Point—How Cryotron Components and Circuitry Can Be Used," Automatic Control, August 1956.